US010749956B2

(12) United States Patent
Battle et al.

(10) Patent No.: US 10,749,956 B2
(45) Date of Patent: Aug. 18, 2020

(54) AGGREGATED ACCESS TO STORAGE SUBSYSTEM

(71) Applicant: Microsoft Technology Licensing, LLC, Redmond, WA (US)

(72) Inventors: Ryan Battle, Austin, TX (US); Kanaka Komandur, Redmond, WA (US); Aditya Desai, Issaquah, WA (US); Costel Radu, Redmond, WA (US); Jared Lambert, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 493 days.

(21) Appl. No.: 14/973,912

(22) Filed: Dec. 18, 2015

(65) Prior Publication Data

US 2016/0359975 A1 Dec. 8, 2016

Related U.S. Application Data

(60) Provisional application No. 62/172,439, filed on Jun. 8, 2015.

(51) Int. Cl.
*H04L 29/08* (2006.01)
*G06F 3/06* (2006.01)
(Continued)

(52) U.S. Cl.
CPC .......... *H04L 67/1097* (2013.01); *G06F 3/061* (2013.01); *G06F 3/0604* (2013.01);
(Continued)

(58) Field of Classification Search
CPC . H04L 63/0428; H04L 67/1097; H04L 9/321; H04L 63/0823; H04L 63/0815;
(Continued)

(56) References Cited

U.S. PATENT DOCUMENTS 7,680,825 B2 3/2010 Becker
7,921,299 B1 4/2011 Anantha et al.
(Continued)

FOREIGN PATENT DOCUMENTS

WO 2013191833 A1 12/2013

OTHER PUBLICATIONS

PCT/US2016/036272 International Search Report and Written Opinion dated Sep. 1, 2016, 12 pages.
(Continued)

*Primary Examiner* — Barbara B Anyan
(74) *Attorney, Agent, or Firm* — Christopher R. Christenson; Kelly, Holt & Christenson PLLC

(57) ABSTRACT

A computing system for managing storage relative to a storage subsystem is provided. The computing system includes a processor and a first interface configured to interact with a deployed software system using a representational state transfer communication technique. A second interface is configured to interact with the storage subsystem in accordance with the representational state transfer technique. The computing system is configured to interact with the storage subsystem via the second interface in response to a request from the deployed software system via the first interface and to provide an output to the deployed software system through the first interface based on the interaction with the storage subsystem.

12 Claims, 8 Drawing Sheets

(51) Int. Cl.
*H04L 12/24* (2006.01)
*G06F 9/54* (2006.01)
*H04L 29/06* (2006.01)
*G06F 16/27* (2019.01)
*H04L 12/26* (2006.01)
*G06F 21/56* (2013.01)

(52) U.S. Cl.
CPC ............ *G06F 3/067* (2013.01); *G06F 3/0631* (2013.01); *G06F 9/54* (2013.01); *G06F 16/27* (2019.01); *G06F 21/561* (2013.01); *H04L 41/12* (2013.01); *H04L 41/20* (2013.01); *H04L 41/22* (2013.01); *H04L 43/0876* (2013.01); *H04L 63/0815* (2013.01); *H04L 63/0823* (2013.01); *H04L 67/02* (2013.01); *H04L 67/06* (2013.01)

(58) Field of Classification Search
CPC .. H04L 43/0876; G06F 3/0611; G06F 3/0631; G06F 21/561; G06F 16/27
See application file for complete search history.

(56) References Cited

U.S. PATENT DOCUMENTS

| | | | |
|---|---|---|---|
| 8,291,490 | B1 | 10/2012 | Ahmed et al. |
| 8,601,263 | B1* | 12/2013 | Shankar ............... H04L 63/0428 713/166 |
| 8,612,439 | B2 | 12/2013 | Prahlad et al. |
| 8,620,879 | B2 | 12/2013 | Cairns |
| 8,719,223 | B2 | 5/2014 | Knapp et al. |
| 8,769,269 | B2 | 7/2014 | Anglin et al. |
| 8,775,507 | B2 | 7/2014 | Wang et al. |
| 9,015,212 | B2 | 4/2015 | David et al. |
| 2010/0332479 | A1 | 12/2010 | Prahlad et al. |
| 2011/0066668 | A1* | 3/2011 | Guarraci ................. G06F 16/27 707/831 |
| 2012/0324069 | A1 | 12/2012 | Nori et al. |
| 2013/0046894 | A1 | 2/2013 | Said et al. |
| 2013/0179982 | A1* | 7/2013 | Bridges ............... H04L 63/0823 726/26 |
| 2013/0191842 | A1 | 7/2013 | Sripathi Panditharadhya et al. |
| 2013/0219176 | A1* | 8/2013 | Akella ................ H04L 63/0815 713/165 |
| 2013/0332927 | A1 | 12/2013 | Tang et al. |
| 2013/0346718 | A1 | 12/2013 | Meshchanivnov |
| 2014/0007239 | A1* | 1/2014 | Sharpe .................. G06F 21/561 726/24 |
| 2014/0089273 | A1 | 3/2014 | Borshack et al. |
| 2014/0108474 | A1* | 4/2014 | David .................... G06F 3/0611 707/827 |
| 2014/0143422 | A1 | 5/2014 | Joseph et al. |
| 2014/0237373 | A1 | 8/2014 | Kennedy et al. |
| 2014/0279887 | A1 | 9/2014 | Tomono et al. |
| 2014/0280975 | A1 | 9/2014 | Mordani et al. |
| 2014/0281292 | A1 | 9/2014 | Isaacson et al. |
| 2014/0289391 | A1 | 9/2014 | Balaji et al. |
| 2014/0366155 | A1 | 12/2014 | Chang et al. |
| 2015/0007263 | A1 | 1/2015 | Stewart et al. |
| 2015/0012639 | A1 | 1/2015 | Mclean |
| 2016/0041787 | A1* | 2/2016 | Nicolae ................. G06F 3/0631 710/74 |
| 2016/0323377 | A1* | 11/2016 | Einkauf .............. H04L 43/0876 |

OTHER PUBLICATIONS

Yamatoya, Takahito, "Multitenant Applications in Azure", Retrieved on: May 22, 2015 Available at: https://github.com/Azure/azure-content/blob/master/articles/dotnet-develop-multitenant-applications.md.

Liu, et al., "DAX: A Widely Distributed Multitenant Storage Service for DBMS Hosting", In Proceedings of the VLDB Endowment, vol. 6, No. 4, Aug. 26, 2013, 12 pages.

Tamram, "How to use Blob storage from .NET", Retrieved on: May 22, 2015 Available at: http://azure.microsoft.com/en-in/documentation/articles/storage-dotnet-how-to-use-blobs/#what-is-blob-storage.

"Controlling Access to Object Store: Using TempURLs and Cross Tenant ACLs for digital content distribution and collaboration solutions", Published on: Oct. 5, 2014 Available at: http://www.hpcloud.com/content/controlling-access-object-store-using-tempurls-and-cross-tenant-acls-digital-content-distribution.

"Rollbase Architecture", Retrieved on: Oct. 30, 2015 Available at: https://www.progress.com/rollbase/content/architecture.

* cited by examiner

AGGREGATED ACCESS TO STORAGE SUBSYSTEM

CROSS-REFERENCE TO RELATED APPLICATION

The present application is based on and claims the benefit of U.S. provisional patent application Ser. No. 62/172,439, filed Jun. 8, 2015, the content of which is hereby incorporated by reference in its entirety.

BACKGROUND

Computing systems are currently in wide use. As one example, a computing system stores data as entities or other data records and commonly includes process functionality that facilities performing various processes or tasks on the data. Users log into or otherwise access the computing system in order to perform the processes and tasks. The data can include user data as well as entities or records that are used to describe various aspects of the computing system.

An organization may use a computing system to create, track, and manage various aspects of the organization and to conduct a variety of different activities. For instance, a user within the organization may use the computing system to track and process opportunities or commitments with other users or organizations, and to perform entity analysis or management.

The discussion above is merely provided for general background information and is not intended to be used as an aid in determining the scope of the claimed subject matter.

SUMMARY

A computing system for managing storage relative to a storage subsystem is provided. The computing system includes a processor and a first interface configured to interact with a deployed software system using a representational state transfer (REST) communication technique. A second interface is configured to interact with a storage subsystem in accordance with the representational state transfer communication technique. The computing system is configured to interact with the storage subsystem via the second interface in response to a request from the deployed software system via the first interface and to provide an output to the deployed software system through the first interface based on the interaction with the storage subsystem.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF PREFERRED EMBODIMENTS

Figure 1:
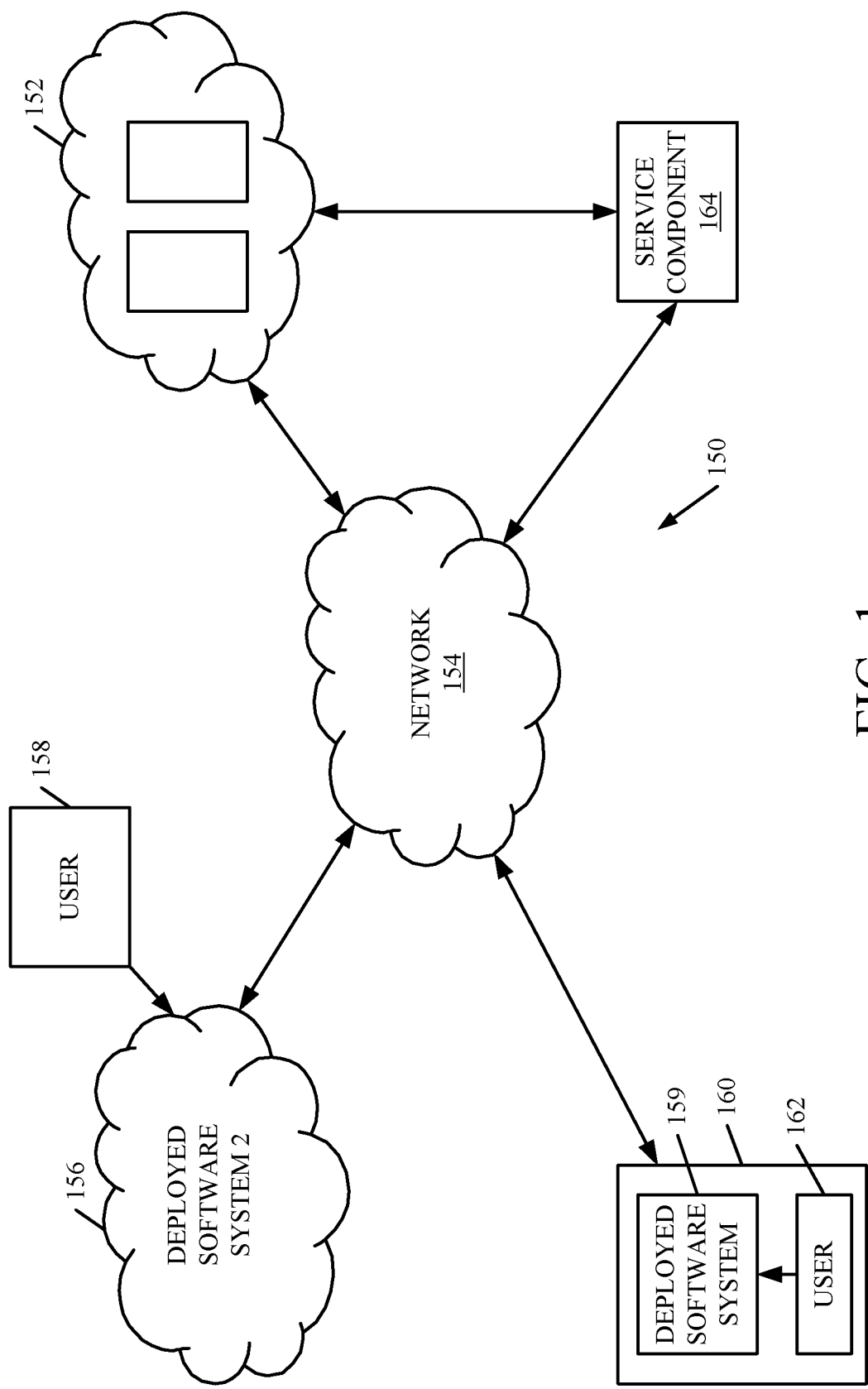
FIG. 1 is a diagrammatic view of a computing environment in which embodiments described herein are particularly applicable.

In accordance with various embodiments of the present invention, a service component is provided on top of, or in addition to, traditional cloud storage, such as that provided by Azure available from Microsoft Corporation, of Redmond Washington. This service component makes it easier for application builders or developers to facilitate application management of various assets with respect to a particular tenant such that all of the storage underneath and exposed up to the application is scoped to tenant storage which is defined by the system. In other words, embodiments described herein generally allocate and/or manage cloud storage subsystem resources for consumption by application developers across binary large object (BLOB), tables, containers, etc. Accordingly, the application developer or builder can have confidence that he or she has access to assets of only an authorized tenant. In some embodiments, the provision of an access layer between a deployment of a software system and a cloud storage subsystem simplifies operation and/or design of the deployed software system as it no longer requires significant overhead for cloud-based data storage. This simplification increases the efficiency of the deployed software system and potentially increases the efficiency of network bandwidth usage.

As used herein, a "tenant" is group of users who share a common access with specific privileges to a deployment of a software system. One example of such a tenant is an organization. Such software systems may typically be shipped from a software manufacturer in an initial state, and then customized, sometimes heavily so, in order to be deployed for a particular tenant.

Cloud computing provides remote, network-accessible, computation, software, data access, and/or storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of the computing architecture as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

FIG. 1 is a diagrammatic view of a computing environment in which embodiments described herein are particularly applicable. Environment 150 generally includes a distributed storage subsystem 152 that is accessible via a network 154. Network 154 may be any combination of local area networks, wide area networks, etc. In one embodiment, network 154 is the internet. In one embodiment, storage subsystem 152 is massively scalable such that it can store and process hundreds of terabytes of data to support big data scenarios required by scientific, financial analysis, and media applications. Storage subsystem 152 may employ an auto-partitioning system that automatically load-balances data based on traffic. Further, via network 154, storage subsystem 152 is accessible from anywhere in the world from any type of application whether it is running in the cloud, on the desktop, or an on-premises server, or on a mobile or tablet device.

As shown in FIG. 1, a pair of deployed software systems are illustrated. Specifically, a cloud-based deployed software system 156 is illustrated providing access to one or more users 158. Additionally, another deployed software system 159 is deployed on customer premises 160 and provides access to one or more users 162. FIG. 1. illustrates that the deployed software systems may be both cloud-based and on-premises based. Additionally, while a pair of deployed software systems are shown in FIG. 1, those skilled in the art will recognize that embodiments described herein can support any number of deployed software systems. In general, embodiments described herein generally improve storage provided to deployed software systems using cloud-based storage subsystem 152. Deployed software systems 156 and 159 typically require reliable storage access to store, manage and share application state and artifacts with other services. As used herein, "artifacts" are individual files that can be stored in BLOB storage with metadata for each of the files. Additionally, embodiments described herein will also reference "storage components." Storage components are essentially collections of artifacts having associated metadata. The storage component metadata can be used as an aid in retrieving a component based on certain criteria (e.g. filtering).

Typically, deployed software systems in the past were required to understand their own storage solution and methods for exchanging data. Further, applications wishing to share or manage data with such deployed software systems would be required to interact therewith in accordance with the various parameters and protocols of the particular storage implementation.

In accordance with embodiments described herein, a service component 164 is provided that facilitates interaction with cloud storage subsystem 152 without requiring deployed software systems 156 and 159 to understand or accommodate the complexities of the underlying storage subsystem. Instead, application developers, when deploying or otherwise interacting with software subsystems 156 and 159 can utilize library components provided with the initial software subsystem in order to configure interaction with the cloud storage subsystem 152. The library components facilitate interaction with an API of service component 164. The deployed software systems 156, 159 interact with service component 164 via network 154 in accordance with the libraries provided to the developer and the API of service component 164.

In one embodiment, the API of service component 164 supports both artifacts and storage components. An artifact may be implemented as a public class as follows:

```
///<summary>
/// Artifact used for catalog storage
/// </summary>
public class Artifact
{
        /// <value>
        /// The identifier.
        /// </value>
        [xmlAttribute("id")]
        public string Id { get; set; }
        ///<value>
        /// The name of the artifact.
        ///</value>
        [xmlAttribute("Name")]
        public string Name { get; set; }
        ///<value>
        /// The description.
        ///</value>
        [xmlAttribute("Description")]
        public string Description { get; set; }
        ///<value>
        /// The category.
        ///</value>
        [xmlAttribute("Category")]
        public string Category { get; set; }
        ///<summary>
        /// Gets or sets the accessibility (private/public).
        ///</summary>
        [xmlAttribute("Accessibility")]
        public string Accessibility { get; set; }
        ///<summary>
        /// Gets or sets the expiration duration.
        ///</summary>
        [xmlAttribute("ExpirationDuration")]
        public DateTime ExpirationDuration { get; set; }
        ///<value>
        /// The blob link.
        ///</value>
        [xmlAttribute("Bloblink")]
        public string Bloblink { get; set; }
        ///<summary>
        /// Whether it should be overwritten or not.
        ///</summary>
        [xmlAttribute("MakeUnique")]
        public bool MakeUnique { get; set; }
        ///<summary>
        /// Attributes to be used in filtering.
        ///</summary>
        [xmlAttribute("Attributes")]
        public Dictionary<String, string> Attributes { get; set; }
}
```

The accessibility feature set forth above helps determine whether artifacts can be placed in containers that are public or private. Additionally, the MakeUnique feature helps determine whether artifacts need to be disambiguated. A value of true indicates that if an artifact with the same name is uploaded, it will put it in a new blob location with a GUID specified in the path to disambiguate it.

Service component 164 manages the storage accounts and binary large object (BLOB) containers where the BLOB s will be stored. Further, service component 164 will create and manage BLOB containers as well as the location where individual files will be stored. When a caller, such as deployed software system 156 or deployed software system 159 requests a new file, service component 164 will interact with cloud storage subsystem 152 in order to create a binary large object container, the binary large object itself, and return information that will allow the caller to store the file in cloud storage subsystem 152 without further interaction with service component 164. In this way, service component 164 is not involved in the actual file transfer to storage subsystem 152, but instead aggregates and/or manages interaction with cloud storage subsystem 152.

In one example, cloud storage subsystem 152 requires interaction in accordance with REST techniques. REST generally stands for REpresentational State Transfer. This is a type of software architecture style that consists of guidelines and practices for creating scalable web services. REST generally sets forth a number of formal constraints such as a client server constraint, a stateless constraint, a cacheable constraint, a layered system constraint, a uniform interface constraint, an identification of resources constraint, a manipulation of resources constraint, a self-descriptive messages constraint, and a hypermedia as the engine of application state constraint. Typically, resources are interacted with through restful APIs and standard http methods such as GET, PUT, POST, or DELETE. The REST APIs for the some storage services, such as those of Azure offer programmatic access to BLOB, Queue, Table, and File services in Azure or in the development environment, via a storage emulator. In one example, all storage services are accessible via REST APIs. The storage services may be accessed from within a service running in Azure or directly over the internet from any application that can send an http/https request and receive an http/https response.

In accordance with one embodiment, the interaction with storage subsystem 152 is in accordance with REST techniques. However, those skilled in the art will recognize that embodiments described herein can be practiced with service component 164 providing aggregated access to a number of cloud storage subsystems. Further, in the event that different cloud storage subsystems have different interface constraints, service component 164 can not only provide aggregated access but can conform the data storage requests from deployed systems 156, 159 to any suitable cloud storage system in accordance with the protocols required of the particular cloud storage system.

In one embodiment, service component 164 supports the following REST APIs:

```
///<summary>
///Gets the artifact based on the id.
///</summary>
///<returns>The artifact selected.</returns>
public IQueryable<Artifact> GetArtifact([FromODataUri]
string artifactId);
///<summary>
///Deletes the artifact based on the specified id.
///</summary>
///<param name="id"> The id of the artifact.</param>
public void DeleteArtifact([FromODataUri] string id);
///<summary>
///Gets the artifact based on the specified attributes.
///</summary>
```

-continued

```
///<param name="attributes"> The filtering criteria of the
artifacts.</param>
public IEnumerable<Artifact> GetArtifact([FromODataUri]
Dictionary<string, string> attributes);
///<summary>
///Updates an existing artifact in storage or inserts a new artifact.
///</summary>
///<param name="artifact"> The details of the artifact.</param>
///<returns>The actual updated artifact instance.</returns>
public HttpResponseMessgae PutArtifact(Artifact artifact);
```

The REST APIs can facilitate interactions with a cloud storage subsystem. In one embodiment, the actual artifact content is uploaded to blob storage. The URL for the blob storage can be stored in metadata maintained in table storage or any other suitable storage. The metadata for blobs can include some information about the description and the expiration.

As set forth above, storage components can be provided as collections of artifacts, in one embodiment, a storage component is implemented as a public class as follows:

```
///<summary>
///Storage component used for Catalog storage
///</summary>
public class Component
{
        ///<value>
        ///The identifier.
        ///</value>
        [xmlAttribute("Id")]
        public string Id { get; set; }
        ///<value>
        ///The name of the Artifact.
        ///</value>
        [xmlAttribute("Name")]
        public string Name { get; set; }
        ///<value>
        ///The description.
        ///</value>
        [xmlAttribute("Description")]
        public string Description { get; set; }
        ///<value>
        ///The type of component (AX7, NAV, etc).
        ///</value>
        [xmlAttribute("DeploymentType")]
        public string DeploymentType { get; set; }
        ///<value>
        ///The product.
        ///</value>
        [xmlAttribute("Product")]
        public string Product { get; set; }
        ///<value>
        ///The platform.
        ///</value>
        [xmlAttribute("Platform")]
        public string Platform { get; set; }
        ///<value>
        ///Gets or sets the expiration duration.
        ///</value>
        [xmlAttribute("ExpirationDuration")]
        public DateTime ExpirationDuration { get; set; }
        ///<value>
        ///The list of artifacts in the storage component.
        ///</value>
        [xmlAttribute("ArtifactIds")]
        public List<string> ArtifactIds { get; set; }
        ///<summary>
        ///Attributes to be used in filtering.
        ///</summary>
        [xmlAttribute("Attributes")]
        public Dictionary<string, string> Attributes { get; set; }
}
```

The type of storage component is, in one embodiment, uniquely identified by an Id. The type of the storage component helps identify the topology and hence the container in which the artifacts belonging to this component would go. Interactions with the storage component can also be in accordance with supported REST APIs. Examples of such supported REST APIs are set forth below:

Computing system 100 can be any type of system that is accessed by users 102 and 104. In one example, but not by limitation, computing system 100 can comprise an electronic mail (e-mail) system, a collaboration system, a document sharing system, a scheduling system, and/or an enterprise system. In one example, computing system 100 comprises a business system, such an enterprise resource

```
///<summary>
///Gets the storage component based on the Id.
///</summary>
///<returns>The storage component selected.</returns>
    public IQueryable<Component> GetComponent([FromODataUri] string componentId);
///<summary>
///Deletes the storage component with the specified Id.
///</summary>
///<param name="Id">The id of the storage component.</param>
public void DeleteComponent([FromODataUri] String id);
///<summary>
///Gets the storage component with the specified attributes.
///</summary>
///<param name="attributes">The filtering criteria of the storage
    component.</param>
///<returns>The storage component with the provided id.</returns>
    public IEnumerable<Component> GetComponent([FromODataUri]
Dictionary<string, string> attributes);
///<summary>
///Updates an existing storage component or inserts a new storage component.
///</summary>
///<param name="Component">The details of the storage component.</param>
///<returns>The actual updated storage component instance.</returns>
    public HttpResponseMessage PutComponent(Component, Component);
```

Figure 2:
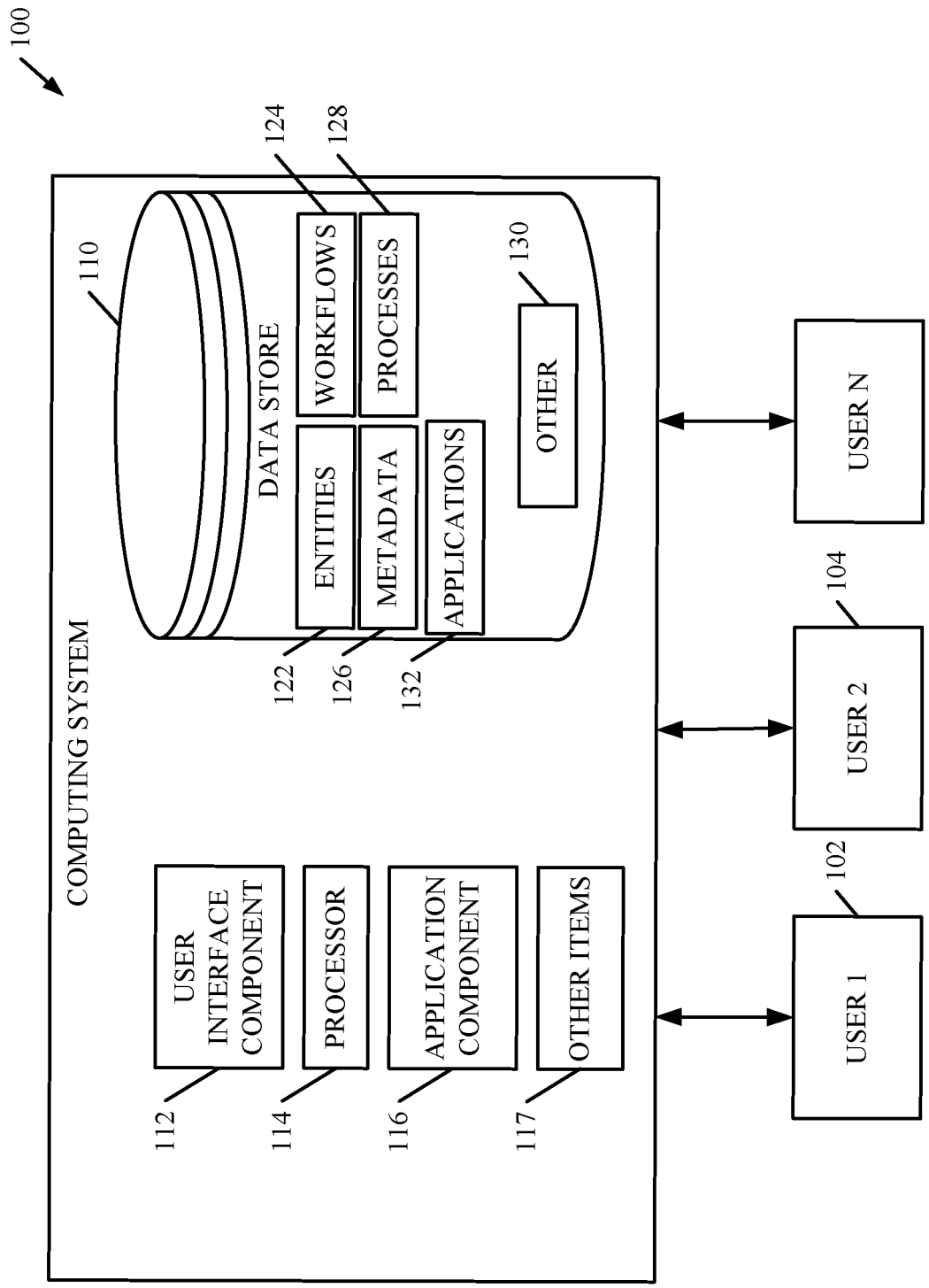
FIG. 2 is a diagrammatic view of a computing system for which aggregated access to storage subsystems in accordance with embodiments described herein is particularly useful.

FIG. 2 is a block diagram of one example of a deployed software subsystem that is accessible by one or more users through one or more user interfaces. For example, each user can access computing system 100 locally or remotely. In one example, one or more users use a representative client device that communicates with computing system 100 over a wide area network, such as the internet. Users interact with user mechanisms to control and manipulate computing system 100. For instance, users can access data in a data store 110. User data access can include, but is not limited to, read access, write access, and/or update access to the data. Updating data can include modifying and/or deleting data in data store 110. For sake of illustration, users 102 and 104 are shown accessing system 100 in FIG. 2. However, it is understood that any number of users can access system 100.

In the example shown in FIG. 2, computing system includes user interface component 112, and at least one processor 114, and an application component 116. Computing system 100 can also include other items 117 as well.

Processor 114 is illustratively a computer processor with associated memory and timing circuitry (not shown). Processor 114 is illustratively a functional part of system 100 and is activated by, and facilitates the functionality of, other systems and components and items in system 100.

Data store 110, in one embodiment, includes data entities 122, workflows 124, processes 128, and applications 132 that are implemented by application component 116 for users 102 and 104 of computing system 100 to perform processes and tasks. Data store 110 may be a local data store of computing system 100, or may be, in one embodiment, at least partially implemented within cloud storage subsystem 152. Information in data store 110 further includes metadata 126 and any other data 130 that can be used by an application component 116 or other items in computing system 100. Entities 122, in one embodiment, describe entities within or otherwise used by system 100.

planning (ERP) system, a customer resource management (CRM) system, a line-of-business system, or another business system. As such, applications 132 can be any suitable applications that may be executed by system 100 in order to perform one or more functions for which system 100 is deployed. Application component 116 access the information in data store 110 in implementing the programs, workflows, or other operations performed by the application component 116. For instance, application component 116, in one example, runs applications 132, which include workflows 124 and processes 128. Workflows 124 and processes 128, in one example, operate upon data entities 122 as well as other data 130 in order to enable the user to perform his or her operations within system 100. In one example, user interface component 112, either by itself or under the control of other systems in the system 100, generates user interface displays for the users.

User interface component 112 senses physical activities, for example, by generating user interface displays that are used to sense user interaction with computing system 100. The user interface displays can include user input mechanisms that sense user inputs in a wide variety of ways, such as point and click devices (e.g., a computer mouse or track ball), a keyboard (either virtual or hardware), and/or a keypad. Further, where the display device used to display the user interface displays is a touch sensitive display, the inputs can be provided as touch gestures. Similarly, the user inputs can illustratively be provided by voice inputs or other natural user interface input mechanisms as well.

As illustrated in FIG. 2, a user interface component 112 is used by parts of system 100 generate user interface displays for users 102 and 104, respectively. In one example, one or more of user interface displays include user input mechanisms that receive inputs from the user for manipulating application component 116 or for manipulating and interacting with other items in computing system 100.

Figure 3:
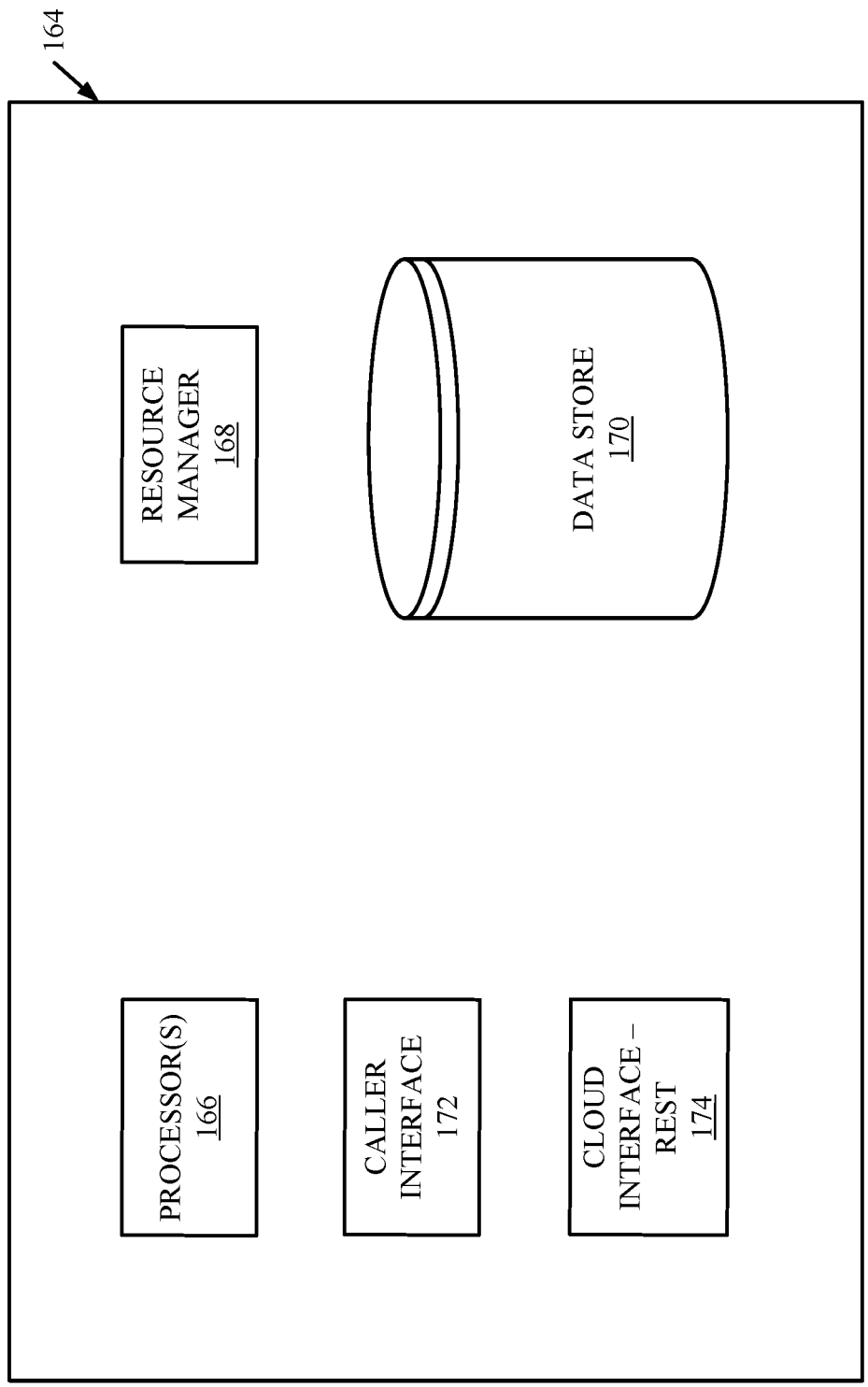
FIG. 3 is a diagrammatic view of a service component providing aggregated access to distributed storage in accordance with embodiments described herein.

FIG. 3 is a diagrammatic view of service component 164 in accordance with embodiments described herein. Service component 164 may be included as part of cloud storage subsystem 152, available via a particular URL, or otherwise. Additionally, service component 164 can be a separate layer or service that interacts with one or more cloud storage subsystems in accordance with their respective interaction protocols or requisites. Service component 164 can include one or more processors 166 as well resource manager 168, and data store 170. Caller interface 172 interacts with various deployed software systems in accordance with library components provided to developers and application developers of software systems 156, 159. Cloud storage subsystem interface 174 includes interface information relative to one or more cloud storage subsystems such that service component 164 can interact with the cloud storage subsystems. Resource manager 168 and data store 170 cooperate to manage information relative to new file storage requests such that when file storage retrieval requests occur, interface information can be provided to the caller more quickly. In this way, service component 164 mediates and/or aggregates access to cloud storage subsystem 152 and potentially allows for sharing the same BLOB storage account among multiple tenants. This is particularly useful in the case of build artifacts of deployed software systems 156 and 159. Further, because the build artifacts are potentially shared, service component 164 can also provide a security solution so that one tenant cannot tamper with, or otherwise access, files used by another tenant. In one embodiment, service component 164 also provides storage accounts as resources to be allocated to tenants. Further, resource manager 168 can register storage accounts such that they can be multi-tenant or single-tenant. Further still, different tenants can specify various capacities required for the storage accounts. Service component 164 helps facilitate the creation of containers on the fly when a caller application requests a file upload. The file scope and accessibility, in one embodiment, are managed by service component 164 to tell the caller which container to create/use. In one embodiment, service component 164 facilitates the utilization of two containers per tenant. A first container is a public container, while the second container is a private container. However, the embodiments described herein can be practiced with any suitable number of containers for various purposes.

Figure 4A:
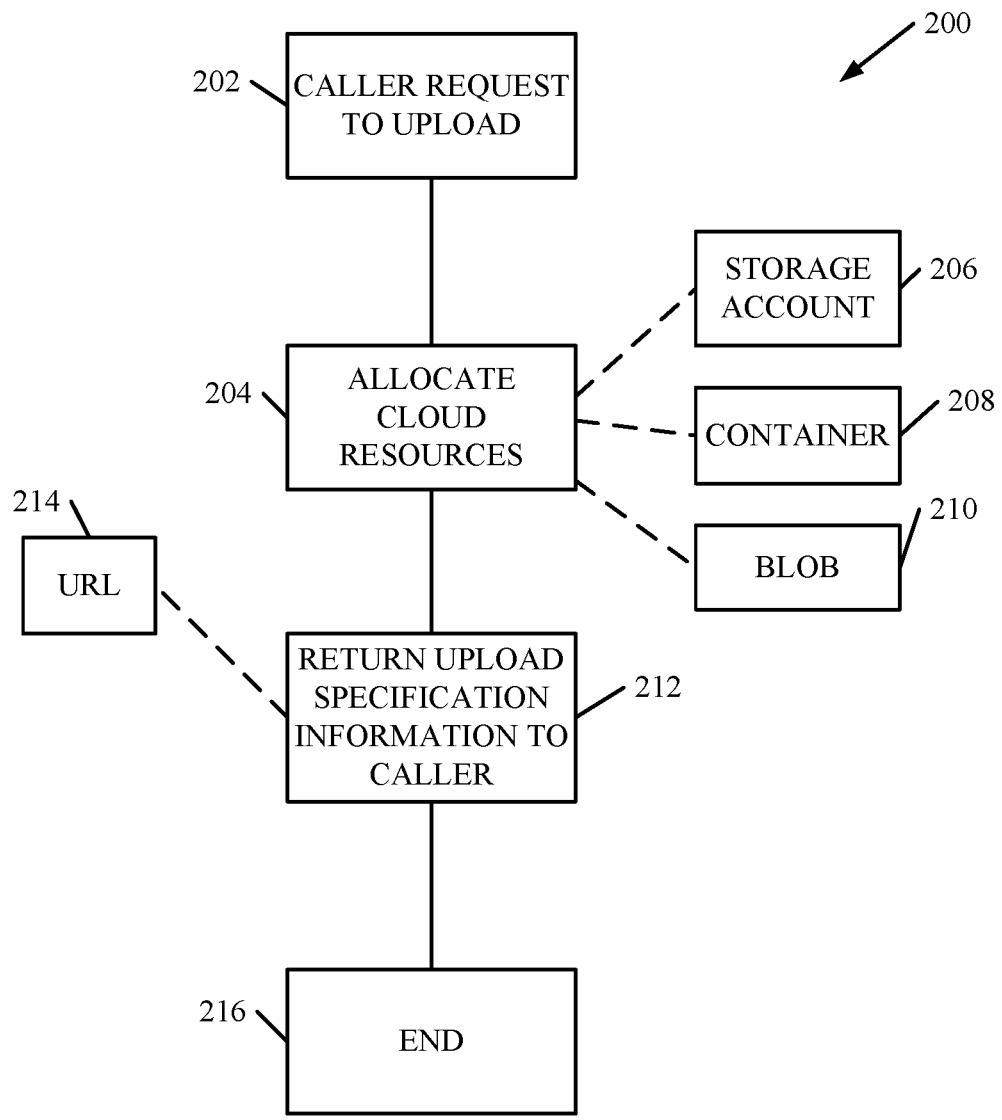
FIGS. 4A and 4B are flow diagrams of a method for storing application data in a distributed subsystem in accordance with one embodiment.
Figure 4B:
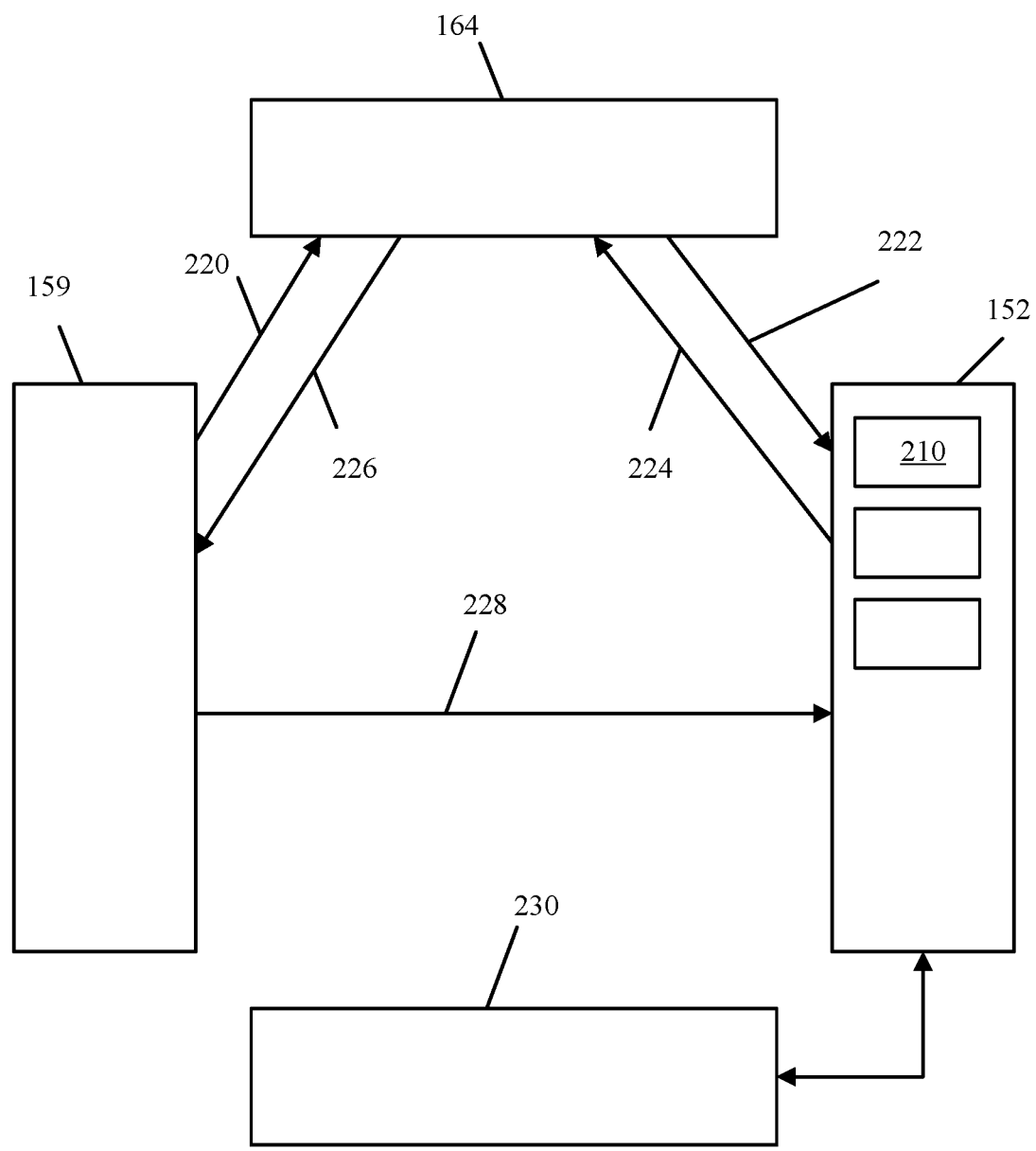

FIGS. 4A and 4B are diagrammatic views of a method of storing data from a deployed software system to a cloud storage subsystem in accordance with one embodiment. Method 200 begins at block 202 where a deployed software system, such as software system 159 (shown in FIG. 4B) generates a request 220 to upload or store information to the cloud storage subsystem. This request 220 is provided to service component 164 via network 154. Service component 164 receives the upload request 220 from the caller system 159 and generates communication 222 with cloud storage subsystem 152 that dynamically allocates cloud resources in response to the request 220, as indicated at block 204. Such allocated cloud resources can include one or more storage accounts 206, one or more storage containers 208, and one or more binary large objects 210. Once the resources have been allocated, service component 164 receives an indication 224 from storage subsystem 152 and returns upload specification information 226 to caller 159, as indicated at block 212. In one embodiment, this upload specification information is provided in the form of a uniform resource locator (URL) 214 that allows caller 159 to interact directly with the cloud storage subsystem 152 in order to transfer the file (indicated diagrammatically at arrow 228 in FIG. 4B) or other information to the resources that have been allocated by service component 164. Accordingly, the file transfer itself from the deployed software system to the cloud storage subsystem does not transit service component 164. Instead, service component 164 is employed ahead of the file transfer in order to aggregate and/or mediate access to the cloud storage subsystem. Once the file transfer completes, control passes to block 216 where method 200 ends. Once storage subsystem 152 receives the file, it can be provided to one or more physical storage devices or networks 230 in any suitable manner.

The placement of service component 164 as an intermediary in the file storage process provides a number of important advantages. For example, the file storage request can be specified as having a definite time at which the file may expire. Upon expiration, service component 164 can automatically initiate a file cleanup process on storage subsystem 152 in order to release resources that were storing the expired file or artifact. Thus, service component 164 may include an internal clock or other suitable logic that automatically determines that the expiration time has arrived and causes service component 164 to initiate the file cleanup process without any additional interaction from caller 159. Additionally, service component 164, in some embodiments may perform one or more checks on the file or files to be stored. Examples of such checks include file size and integrity. However, other suitable checks can be performed as well. Additionally, service component 164 is also well-positioned to provide security features. In one embodiment, the uniform resource locator provided back to the caller can be configured to be limited in the sense that it is only operative for a set period of time, such as 10 minutes, or for only a small number of interactions using the URL, such as a single interaction. Thus, subsequent access to the uploaded information must be through service component 164 using a new uniform resource locator. Further, additional security checks and policies can also be provided. For example, subsequent access to the data can be provided only to the same company (tenant) that stored the data.

Figure 5A:
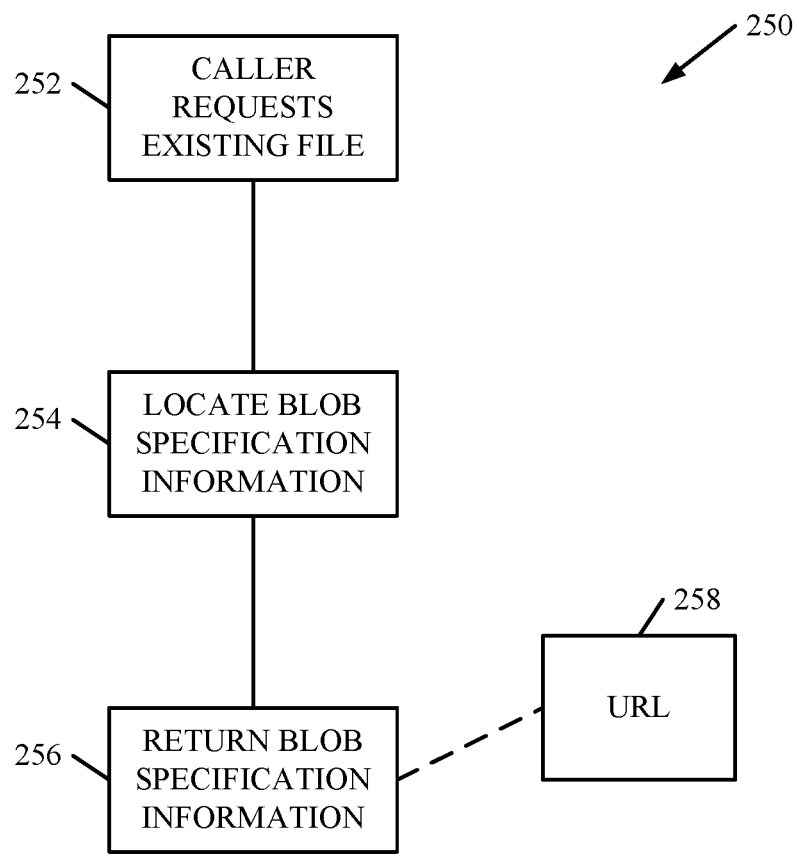
FIGS. 5A and 5B are flow diagrams of a method of retrieving or otherwise accessing information stored in a storage subsystem in accordance an embodiment.
Figure 5B:
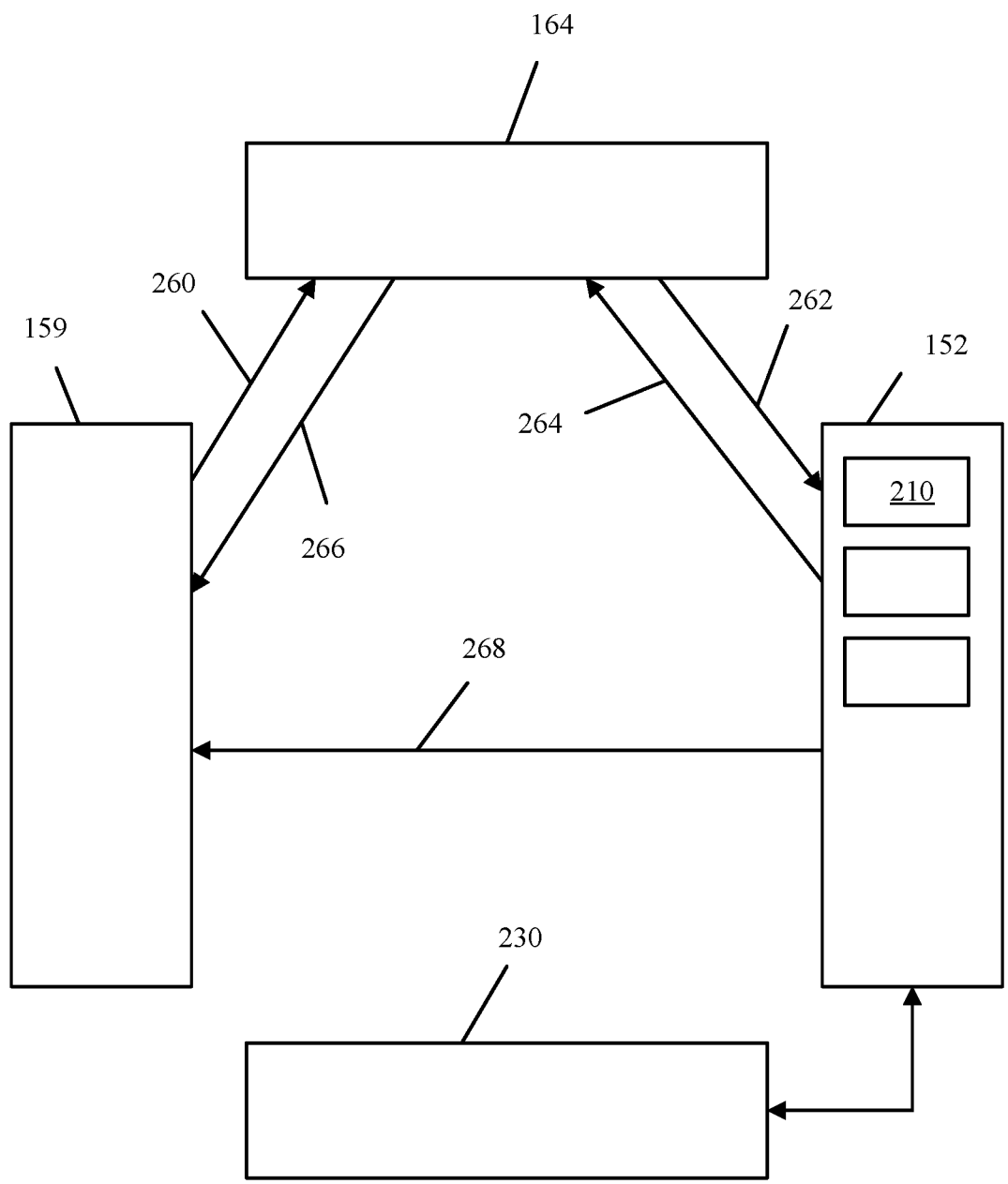

FIGS. 5A and 5B are flow diagrams of a method of retrieving information from a cloud storage subsystem to a deployed software system in accordance with one embodiment. Method 250 begins at block 252 where a deployed software system, such as system 159 generates a request 260 to an existing file from service component 164. When caller software subsystem 159 requests an existing file, service component 164 may, in some embodiments, validate the propriety of the request by ensuring that the requestor is allowed to access the requested file. Then, service component 164 generate a command 262 to subsystem 152 causing subsystem 152 to locate the appropriate binary large object 210, as indicated at block 254. Subsystem 152 returns the location information to service component 164 as indicated at line 264, and service component 164 returns binary large object specification information to the caller via line 266, as indicated at block 256. Such information can include a uniform resource locator 258 of the binary large object containing the requested file. Then, the caller software subsystem 159 can use the BLOB specification information provided at block 256 to interact directly with the cloud storage subsystem 152 to download the existing file as indicated at line 268. Again, the actual download of the file does not transit service component 164. Instead, service component 164 is involved in the aggregated and/or mediated access to cloud storage subsystem 152 when an existing file is required to be retrieved for a deployed software system.

On the file request side, service component 164 also provides a number of advantages. For example, since the service component is logically positioned between the caller software subsystem 159 and storage subsystem 152, all interactions with the data can be logged such that file storage interactions can be audited. For example, the time, date, identity of the user, system or module, can be stored along with the type of file operation (e.g. store, retrieve, modify, delete, archive, etc.). Further still, service components 164 can also facilitate the ability to undelete a file if done within a certain period of time. Moreover, the period of time within which such undelete functionality is provided can be specified to service component 164 when the calling system requests a delete operation.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
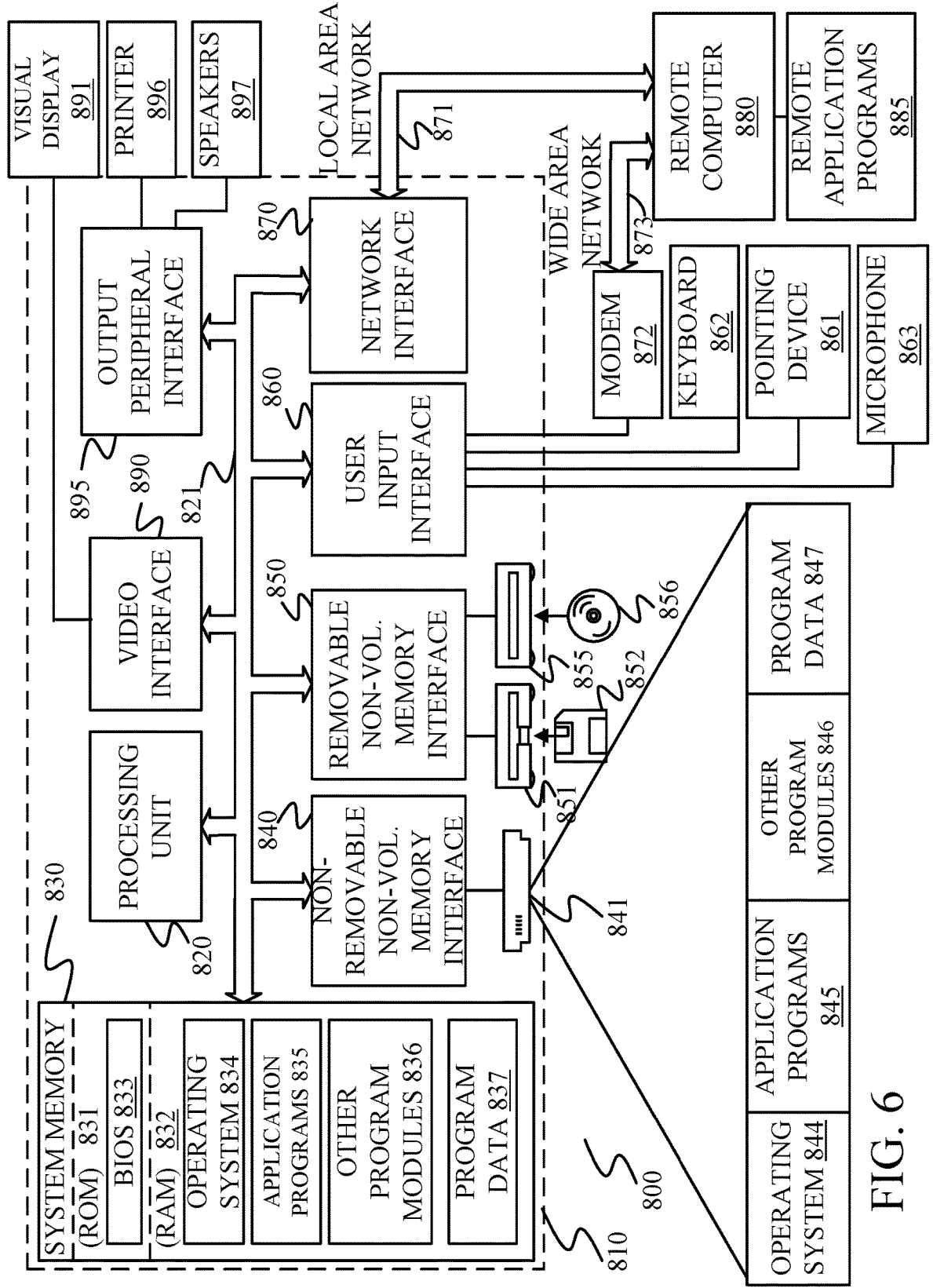
FIG. 6 is a diagrammatic view of one embodiment of a computing environment in which embodiments described herein can be deployed.

FIG. 6 is a diagrammatic view of one embodiment of a computing environment in which architecture 150, deployed software system 156 or 159 or parts thereof, (for example) can be deployed. With reference to FIG. 6, an exemplary system for implementing some embodiments includes a computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system for managing storage relative to a storage subsystem is provided. The computing system includes a processor and a first interface configured to interact with a deployed software system using a representational state transfer (REST) communication technique. A second interface is configured to interact with the storage subsystem in accordance with the representational state transfer communication technique. The computing system is configured to interact with the storage subsystem via the second interface in response to a request from the deployed software system via the first interface and to provide an output to the deployed software system through the first interface based on the interaction with the storage subsystem.

Example 2 is the computing system of any or all previous examples wherein the first interface is configured to interact with the at least one deployed software system in accordance with a library component of the at least one deployed software system.

Example 3 is the computing system of any or all previous examples wherein the second interface is configured to communicate with the at least one storage subsystem over a network.

Example 4 is the computing system of any or all previous examples wherein the computing system is configured to perform a check on a size of a file to be uploaded from the deployed software system to the storage subsystem.

Example 5 is the computing system of any or all previous examples wherein the second interface is configured to interact with the storage subsystem using hypertext transfer protocol (HTTP) methods.

Example 6 is the computing system of any or all previous examples wherein the output is a resource locator to allow the deployed software system to store information directly in the storage subsystem.

Example 7 is the computing system of any or all previous examples wherein the first interface is configured to receive a file storage request, and wherein the processor is configured to generate communication through the second interface that requests creation of a container for the file storage, and wherein the output is indicative of a location of the container.

Example 8 is the computing system of any or all previous examples and further comprising a data store and a resource manager configured to cooperate with the data store to manage information relative to new storage requests received through the first interface.

Example 9 is the computing system of any or all previous examples wherein the resource manager is configured to allow sharing of one storage subsystem account among multiple tenants.

Example 10 is the computing system of any or all previous examples wherein the processor is configured to ensure that each tenant can only access their own tenant data.

Example 11 is the computing system of any or all previous examples wherein the resource manager is configured to register storage accounts as either single-tenant or multi-tenant.

Example 12 is the computing system of any or all previous examples wherein the resource manager is configured to register storage accounts having different capacities.

Example 13 is the computing system of any or all previous examples wherein the resource manager is configured to provide a public container and a private container for each tenant.

Example 14 is a method of storing information. The method includes generating a file storage request with a deployed software system to an application programming interface of a storage service component. Limited use information is received from the storage service component indicative of a location that is configured to receive the file. The received location information is used to directly store the file at a cloud storage subsystem.

Example 15 is the method of any or all previous examples wherein the received location information is in the form of a uniform resource locator.

Example 16 is the method of any or all previous examples wherein the file is an artifact of the deployed software system.

Example 17 is the method of any or all previous examples wherein the limited use information is only valid for a selected period of time.

Example 18 is the method of any or all previous examples wherein the limited use information is only valid for a selected number of interactions.

Example 19 is a method of managing storage of information to a cloud storage subsystem. The method includes receiving a request to store a file from a deployed software system and responsively causing the cloud storage subsystem to allocate a resource to store the file. Limited use upload information is returned to the deployed software system indicative of the allocated resource to allow the deployed software system to directly upload the file to the allocated cloud storage subsystem resource.

Example 20 is the method of any or all previous examples wherein responsively causing the cloud storage subsystem to allocate the resource includes communicating with an application programming interface of the cloud storage subsystem in accordance with representational state transfer (REST) methods.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system for managing storage relative to a storage subsystem, the computing system comprising:
   a processor;
   a first interface configured to interact with a remotely deployed software system over a network in accordance with a library component of the remotely deployed software system, the remotely deployed software system being accessible to a plurality of users over a wide area network; and
   a second interface configured to interact with the storage subsystem in accordance with a representational state transfer (REST) communication technique,
   wherein the computing system is configured to generate communication with the storage subsystem via the second interface to request creation of a container for file storage in response to a file storage request from the remotely, deployed software system via the first interface and to provide a resource locator indicative of a location of the container as an output to the deployed software system through the first interface based on the interaction with the storage subsystem, the resource locator being configured to allow the remotely deployed software subsystem to interact directly with the storage subsystem over the network.

2. The computing system of claim 1, wherein the second interface is configured to communicate with the storage subsystem over a network.

3. The computing system of claim 1, wherein the computing system is configured to perform a check on a size of a file to be uploaded from the deployed software system to the storage subsystem.

4. The computing system of claim 1, wherein the second interface is configured to interact with the storage subsystem using hypertext transfer protocol (HTTP) methods.

5. The computing system of claim 1, and further comprising:
   a data store; and
   a resource manager configured to cooperate with the data store to manage information relative to new storage requests received through the first interface.

6. The computing system of claim 5, wherein the resource manager is configured to allow sharing of one storage subsystem account among multiple tenants.

7. The computing system of claim 6, wherein the processor is configured to ensure that each tenant can only access their own tenant data.

8. The computing system of claim 5, wherein the resource manager is configured to register storage accounts as either single-tenant or multi-tenant.

9. The computing system of claim 5, wherein the resource manager is configured to register storage accounts having different capacities.

10. The computing system of claim 5, wherein the resource manager is configured to provide a public container and a private container for each tenant.

11. A method of managing storage of information to a cloud storage subsystem, the method comprising:
    receiving a request from a deployed software system to store a file;
    responsively causing the cloud storage subsystem to allocate a resource to store the file; and
    returning limited use upload information as a uniform resource locator that is only valid for a selected number of uses relative to the deployed software system, wherein the limited use upload information is indicative of a location configured to receive the allocated resource.

12. The method of claim 11, wherein responsively causing the cloud storage subsystem to allocate the resource includes communicating with an application programming interface of the cloud storage subsystem in accordance with representational state transfer (REST) methods.

* * * * *